Figure 1:
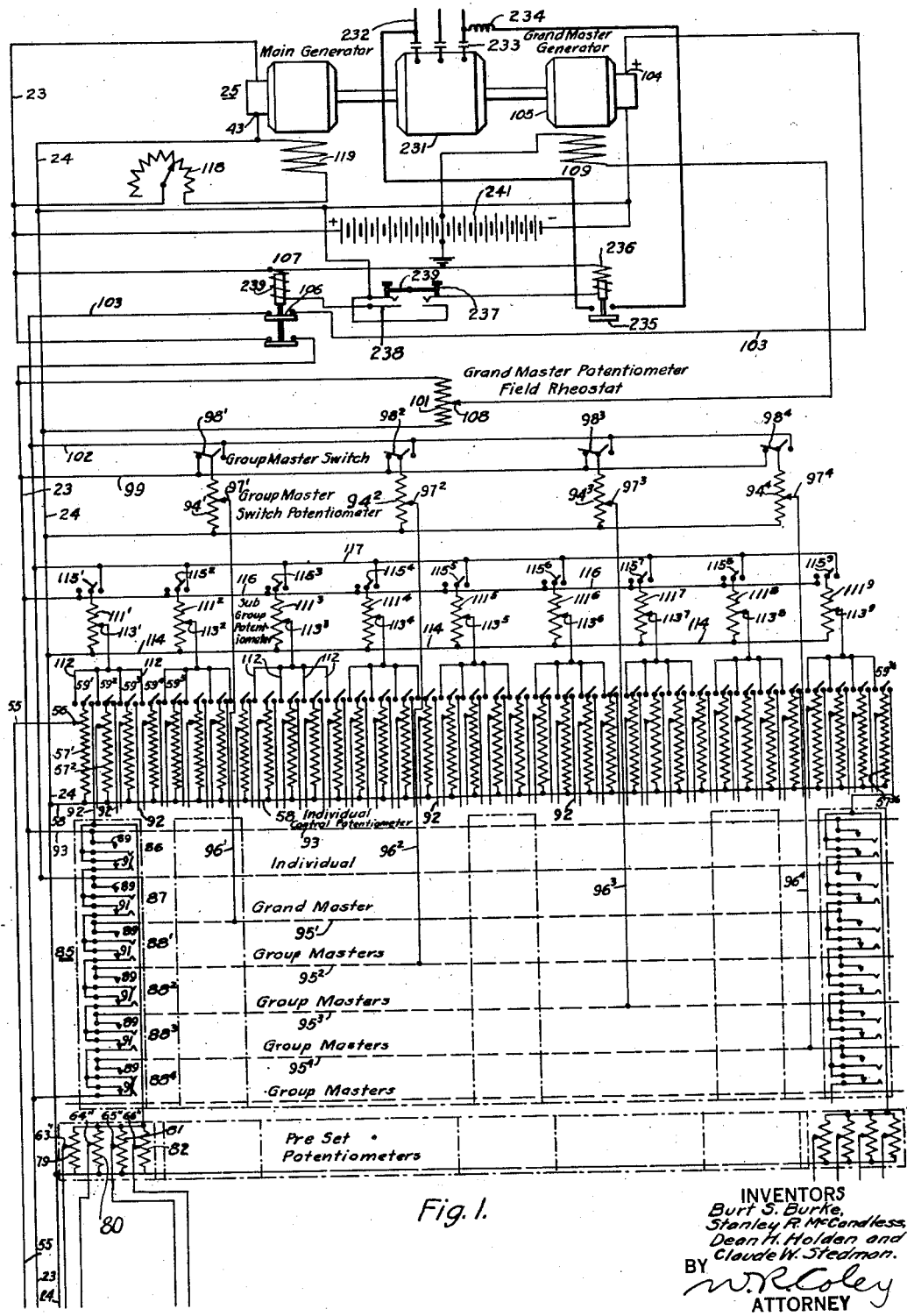

INVENTORS
Burt S. Burke,
Stanley R. McCandless,
Dean H. Holden and
Claude W. Stedman.
BY W.R.Coley
ATTORNEY March 4, 1941.   B. S. BURKE ET AL   2,233,807
THEATER LIGHTING CONTROL APPARATUS
Filed Sept. 10, 1932   12 Sheets-Sheet 4

INVENTORS
Burt S. Burke,
Stanley R. McCandless
Dean H. Holden and
BY Claude W. Stedman
ATTORNEY

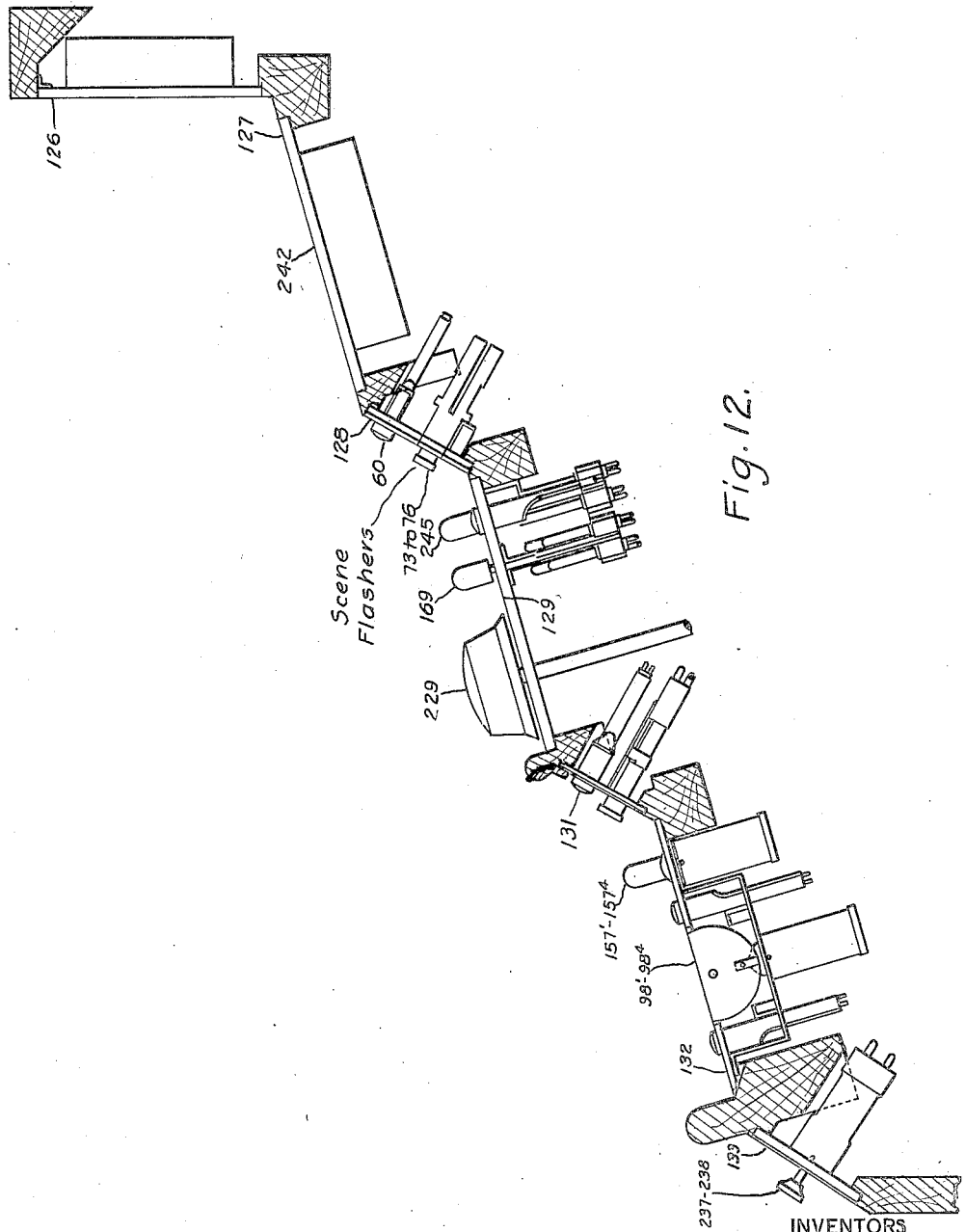

Patented Mar. 4, 1941

2,233,807

UNITED STATES PATENT OFFICE 2,233,807

THEATER LIGHTING CONTROL APPARATUS

Burt S. Burke, Forest Hills, Pa., Stanley R. McCandless, New Haven, Conn., and Dean H. Holden, Cleveland, and Claude W. Stedman, Gates Mills, Ohio; said Burke assignor to Westinghouse Electric & Manufacturing Company, East Pittsburgh, Pa., a corporation of Pennsylvania Application September 10, 1932, Serial No. 632,558

27 Claims. (Cl. 175—312)

The invention relates to control apparatus and particularly to apparatus for controlling theater lighting circuits.

An object of the invention is to provide a control apparatus for theater lighting and like circuits wherein facilities are provided for selectively presetting the lighting characteristics of a plurality of circuits for a number of effects or scenes in advance, and wherein different groups of lighting circuits may be energized predetermined degrees during the selected scenes, and wherein the lighting intensities of the different circuits may be simultaneously varied proportionately from a predetermined intensity to any desired intensity of illumination.

Another object of the invention is to provide a control system for theater lighting and like circuits wherein each circuit contains a plurality of presettable current controlling elements that may be selectively connected in the circuit and wherein a plurality of individual control elements are provided each of which may control the said controlling elements of any desired number of selected circuits.

Another object of the invention is to provide a control system for theater lighting and like circuits wherein the said individual control elements may be actuated individually to vary the light intensity of the circuits then associated therewith, or may be preset to effect predetermined light intensities in the said circuits, and wherein the said individual control elements are divided into sub-groups and influenced simultaneously by a sub-group control element.

A further object of the invention is to provide a control system for theater lighting and like circuits wherein the individual lighting circuits may be (1) selectively placed under the influence of an individual control element in selected groups, (2) or placed under the influence of a subgroup control element in selected group of groups, or (3) selectively and collectively in groups of any number placed under the influence of one of a group of group master control elements which in turn may be influenced simultaneously through a voltage control element such as a grand master potentiometer for controlling the field of the generator supplying the control current.

A further object of the invention is to provide a control system for theater lighting or like circuits having the above-noted characteristics wherein the lighting circuits are controlled through the medium of a reactor and wherein the control apparatus affects the voltage of a grid circuit of a vacuum tube, the output of which is impressed upon the control winding of the reactor.

A further object of the invention is to provide a control system for theater lighting or like circuits wherein the control elements may be compactly arranged in such manner as to render them accessible to an operator who may be seated at a point remote from the stage, and wherein the control elements are arranged in a console similar to that of a pipe organ, and wherein the various control elements may be actuated selectively and individually either manually through finger operated keys, in group through foot pedals or hand operated wheels, or automatically at selected speeds through the medium of motor driven elements under the control of the operator.

A further object of the invention is to provide a control system for theater lighting or like circuits that is capable of producing a great variety of lighting effects which may be selectively prearranged and ultimated at predetermined times, and wherein an endless variety of colors and hues may be attained by proportioning the intensities of the lighting in circuits having the primary colors, and wherein a color composed of the combined colors of several circuits may be maintained without change of hue while being reduced or increased in intensity.

Figure 2:
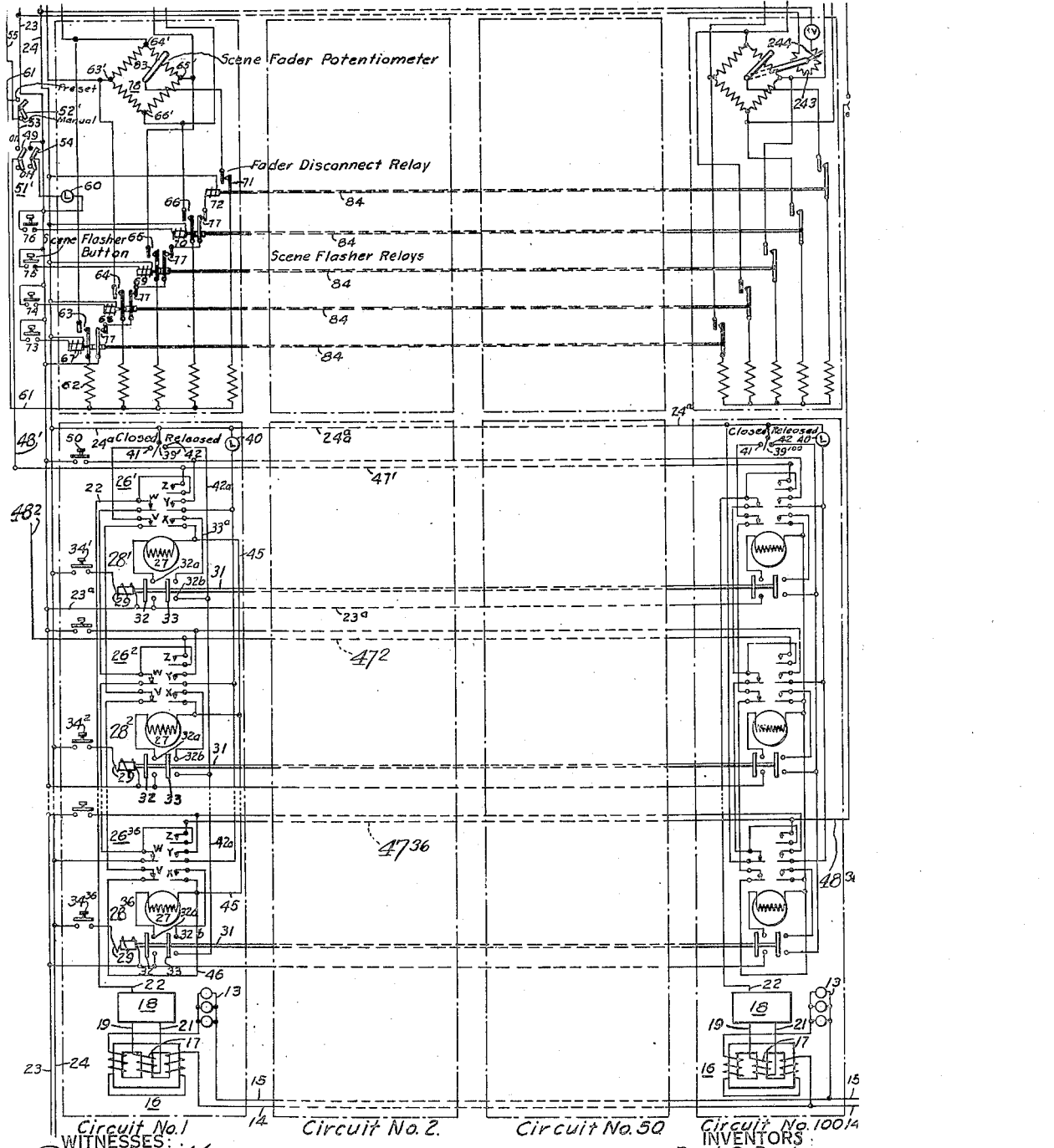
Figure 3:
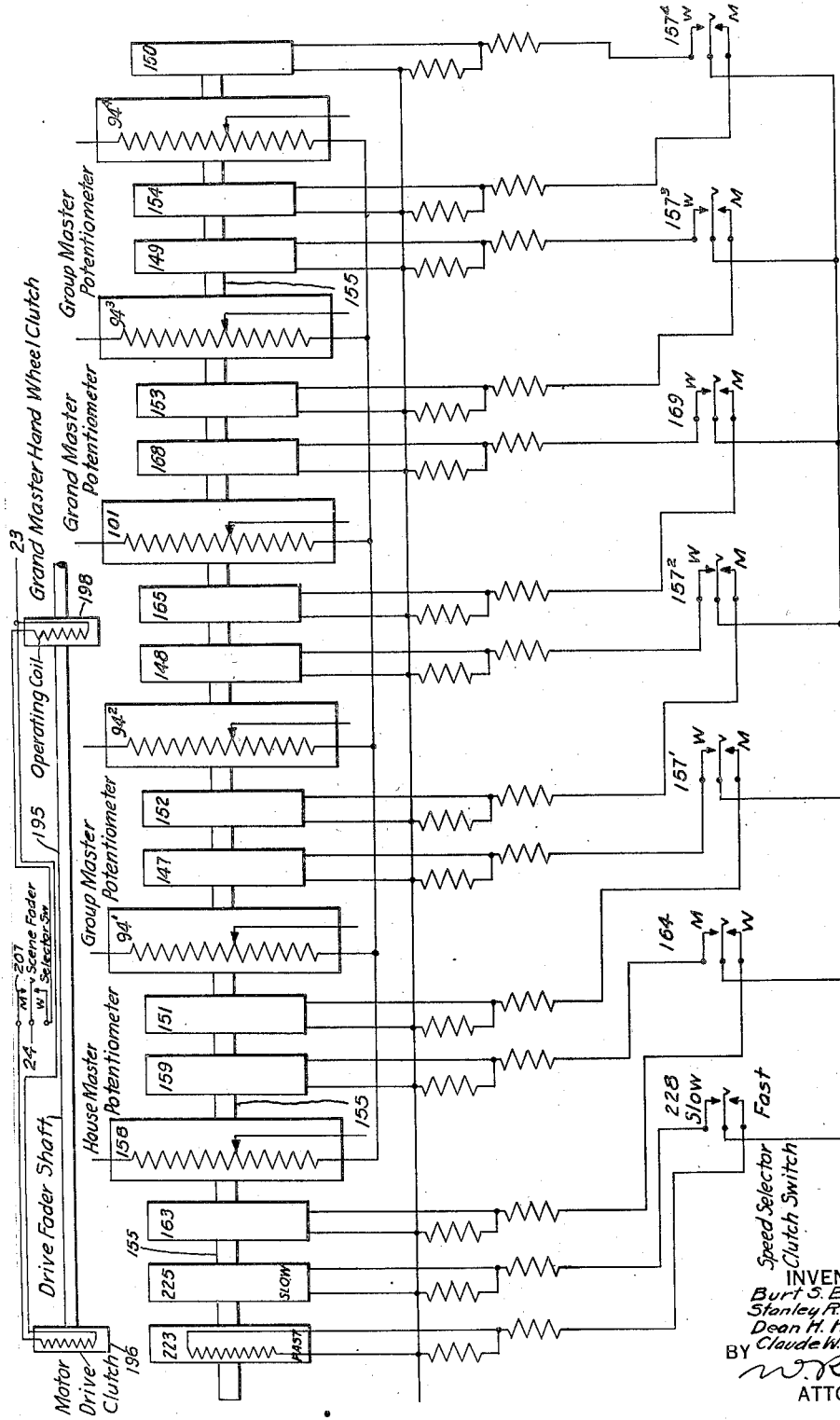
Figure 4:
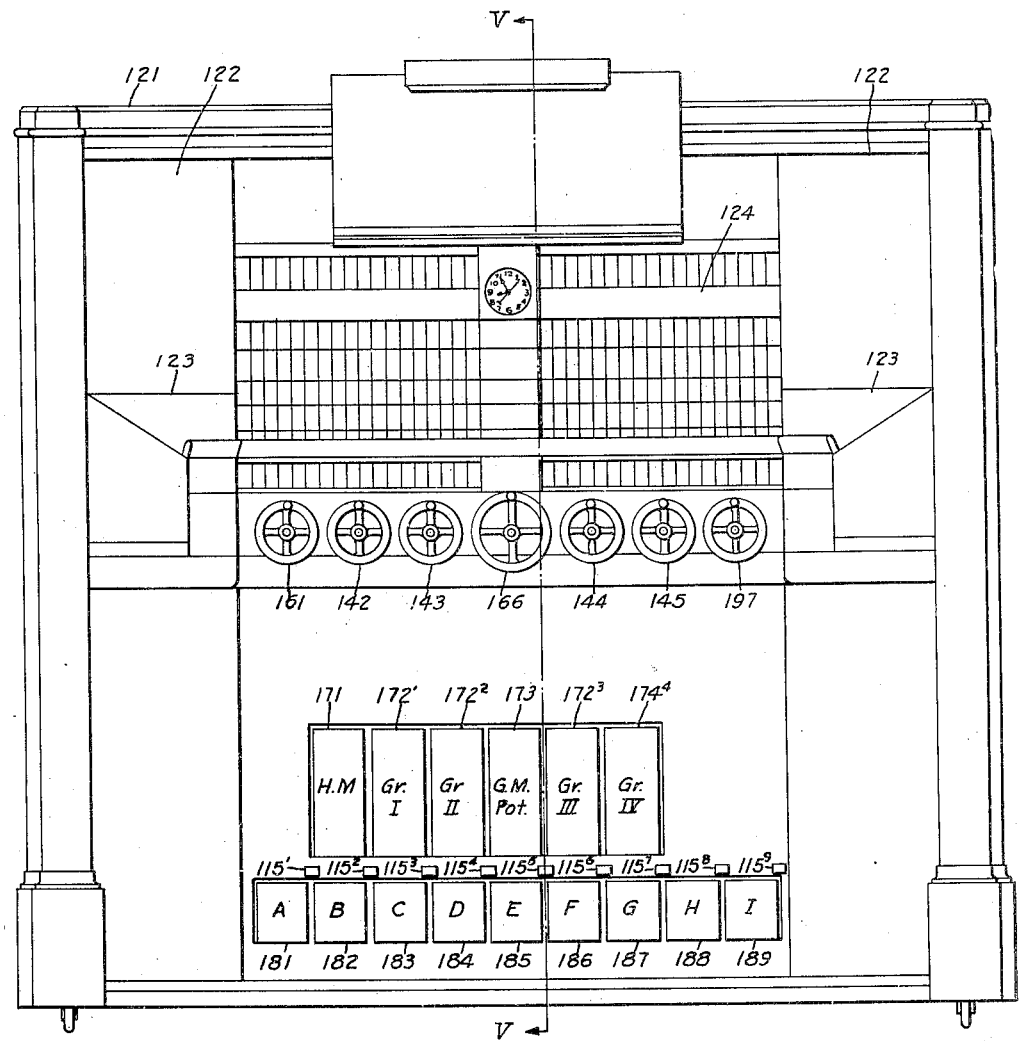
Figure 5:
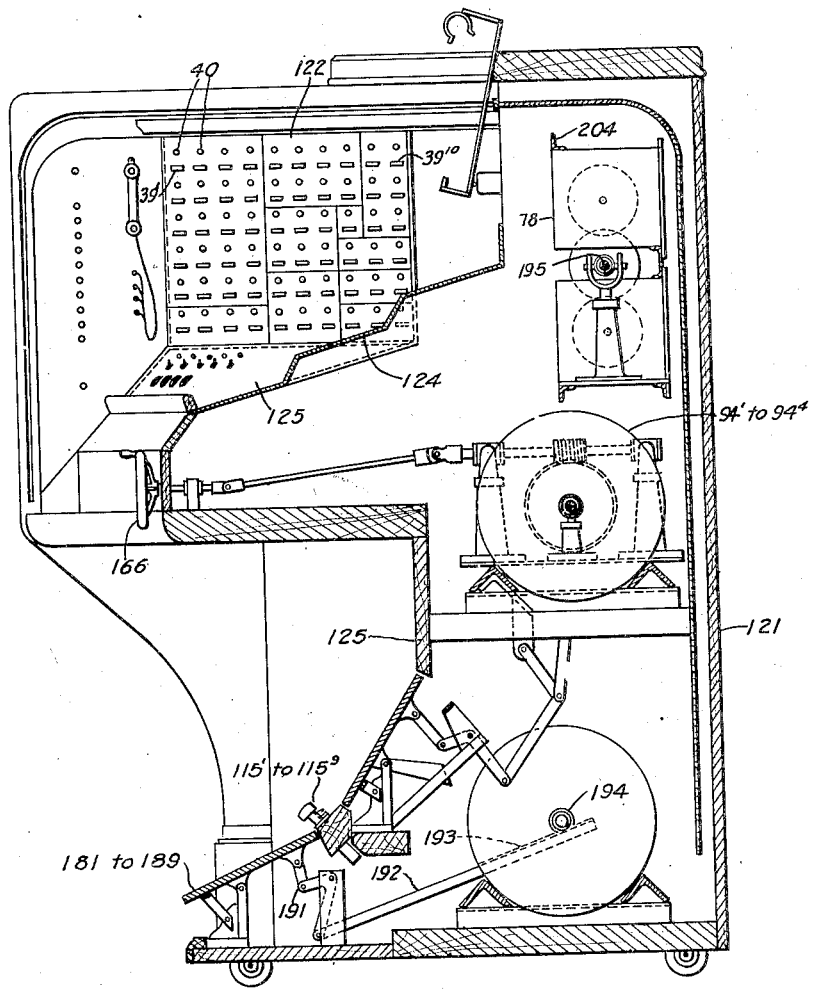
Figure 6:
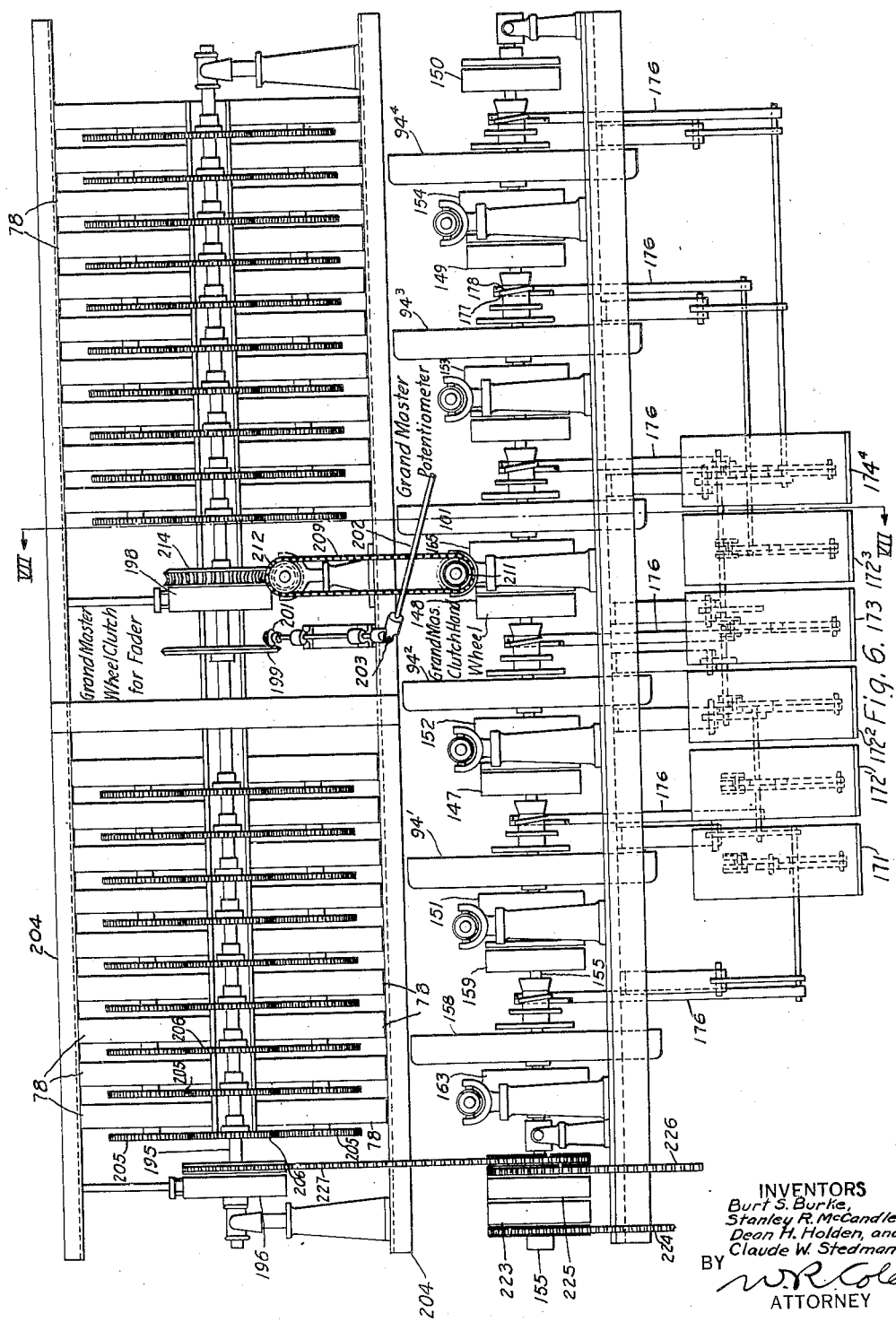
Figure 7:
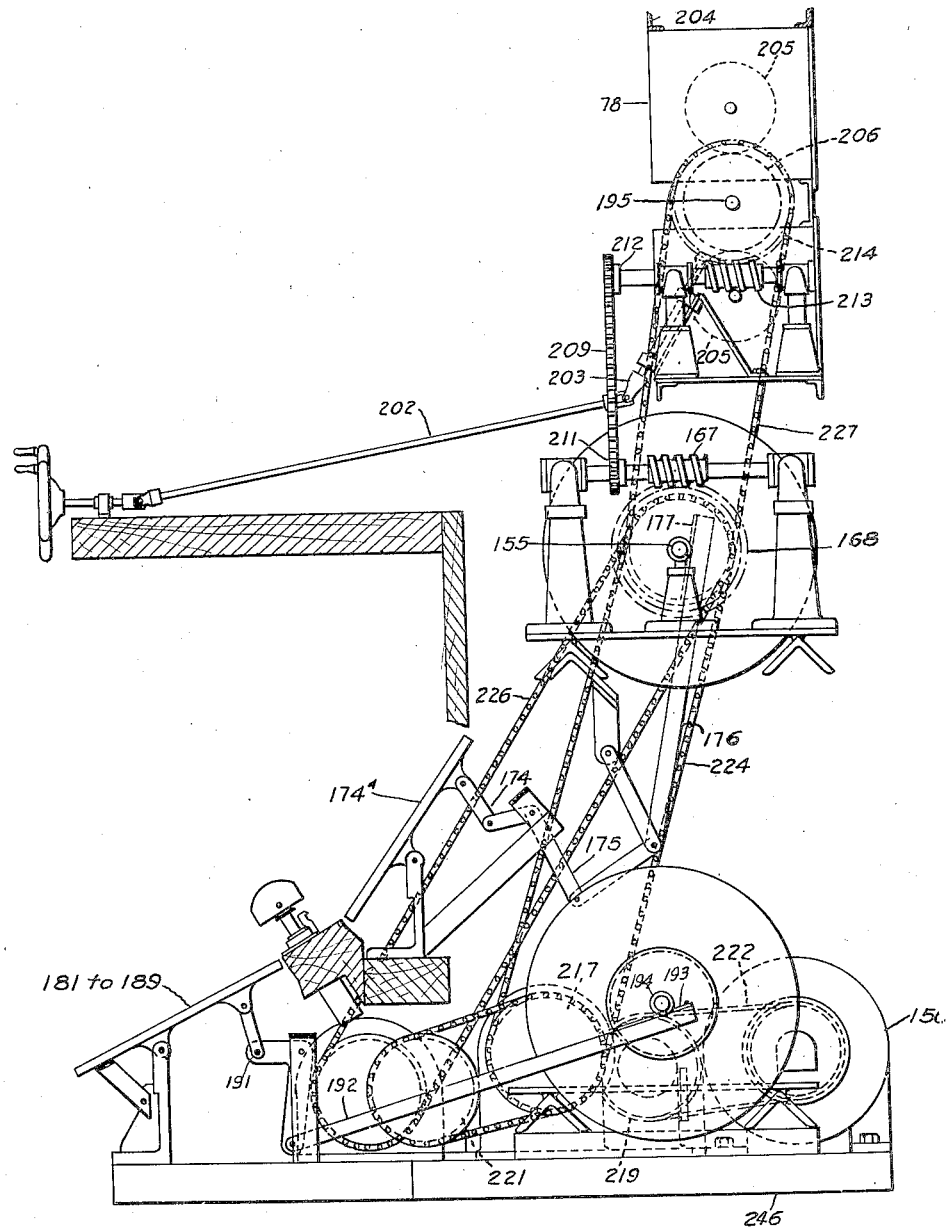
Figure 8:
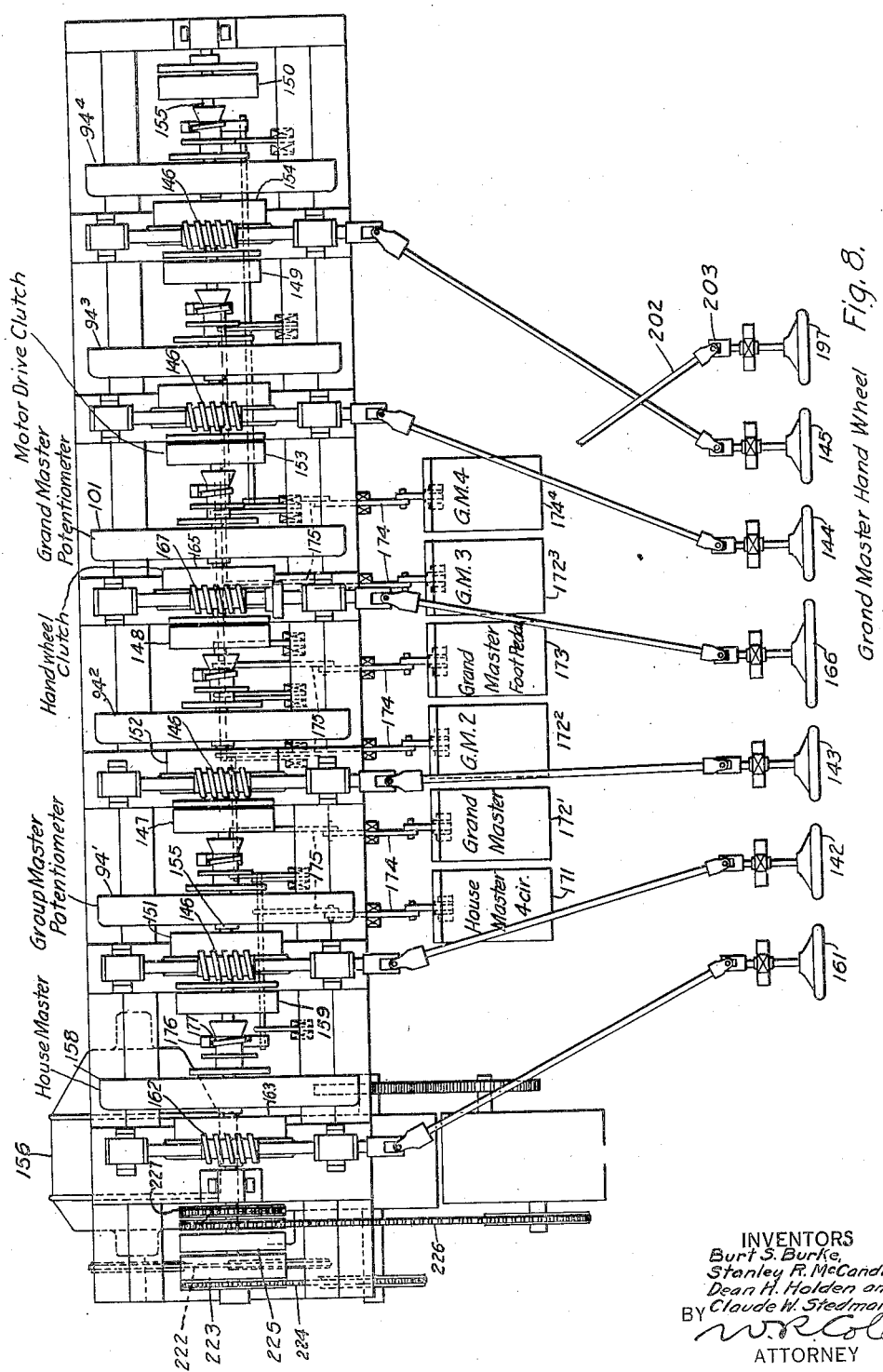
Figure 9:
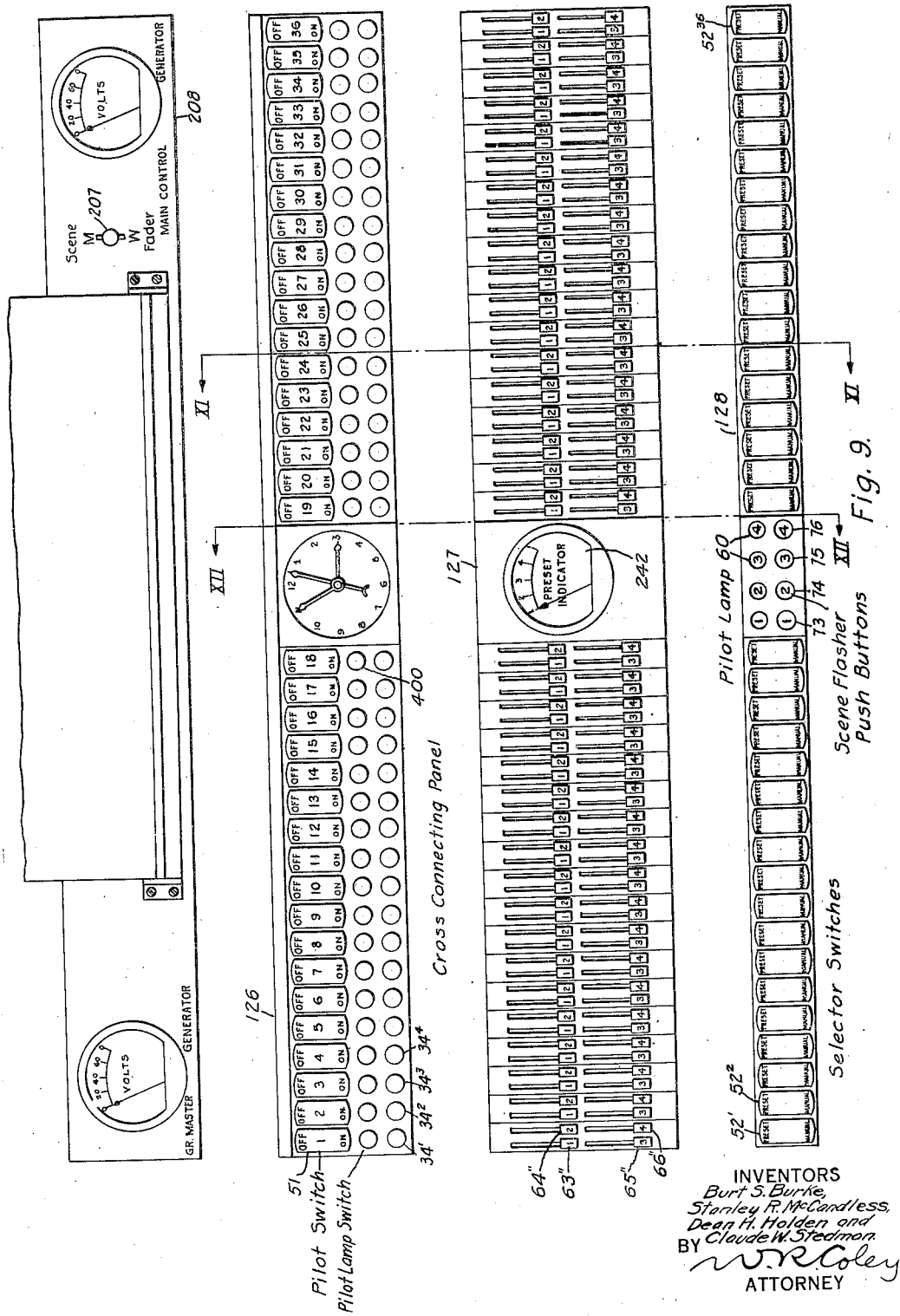
Figure 10:
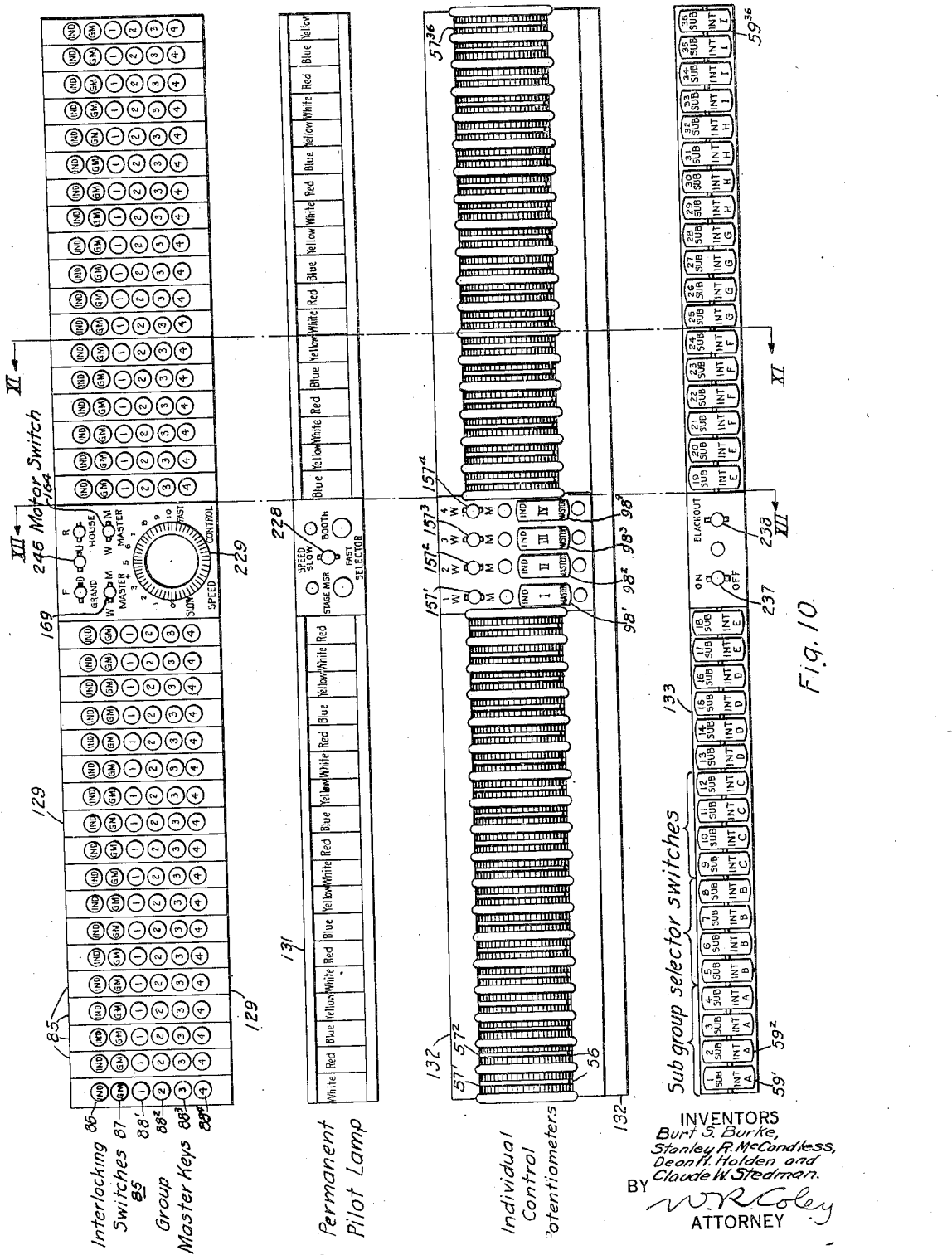
Figure 11:
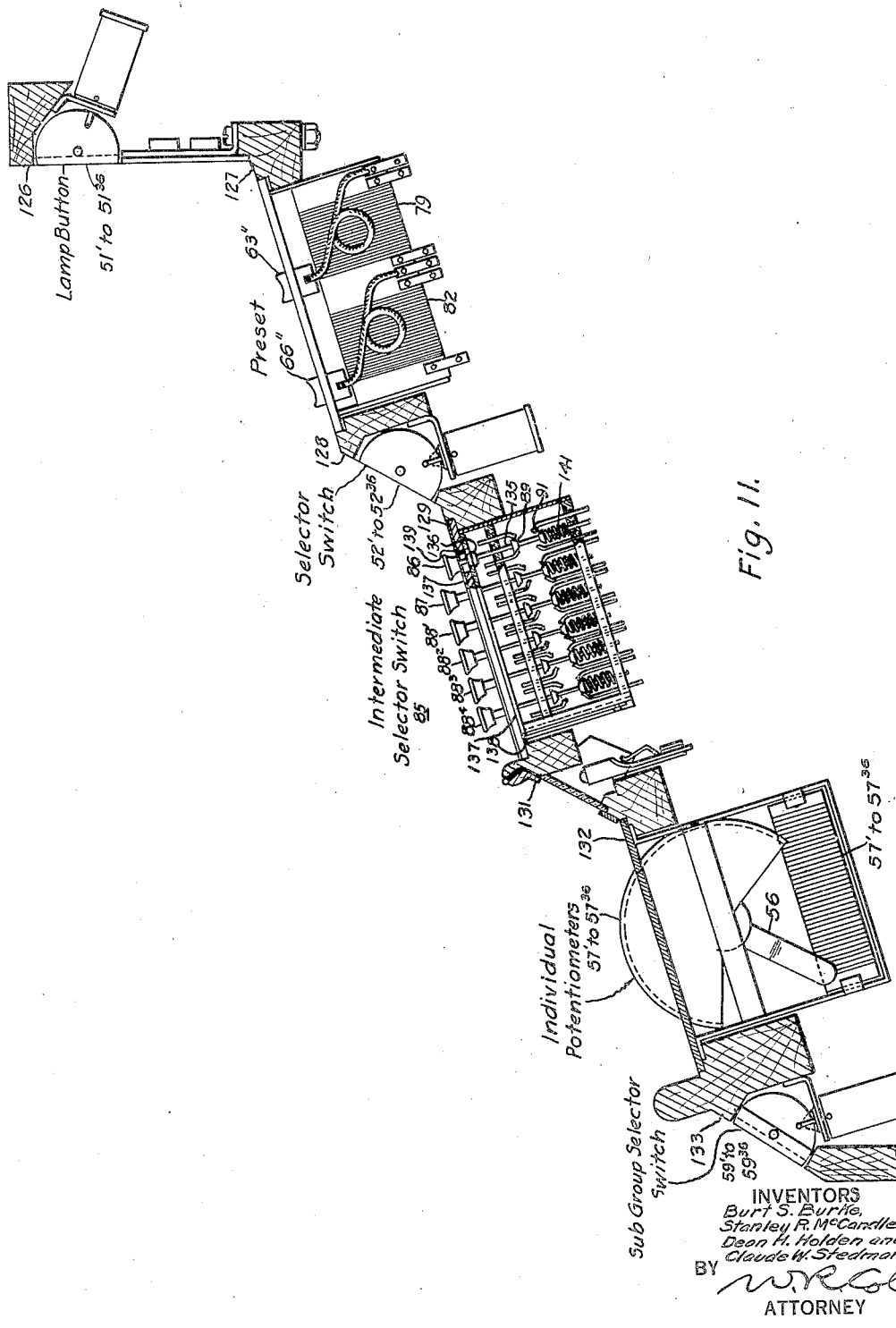

These and other objects that will be made apparent throughout the further description of the invention are attained by means of the control apparatus hereinafter described and illustrated in the accompanying drawings, wherein Figure 1 is a wiring diagram showing a portion of representative circuits wherein features of the invention are embodied, Fig. 2 is a wiring diagram showing a continuation of the circuits illustrated in Fig. 1, Fig. 3 is a wiring diagram illustrating the wiring connections to the master potentiometer clutches, Fig. 4 is a front elevation of a console upon which the control apparatus is mounted, Fig. 5 is a vertical section through the console taken on the line V—V of Fig. 4, Fig. 6 is a top plan view of a portion of the operating mechanism for actuating the master potentiometer and feeders, Fig. 7 is a vertical section through the apparatus shown in Fig. 6 and additional apparatus, taken on the line VII—VII of Fig. 6, Fig. 8 is a plan view of the apparatus shown in Fig. 7, showing a portion of the apparatus below the line XIII—XIII thereof, Figs. 9 and 10 are projected front plan views of the instruments located on the front panels of the console, the instruments shown in Fig. 9 being disposed above those shown in Fig. 10, Figs. 11 and 12 are vertical sections through the portion of the console having the instruments disclosed in Figs. 9 and 10 taken respectively on the lines XI—XI and XII—XII thereof.

Referring to the drawings, the apparatus will best be described by reference to the wiring diagrams illustrated in Figs. 1 and 2 wherein a plurality of circuits are represented, the first and last of the series being represented in full on the left and right sides of the figures respectively, and the intermediate circuits being represented by rectangles in dash and dot lines.

Beginning at the bottom of the diagram on Fig. 2, the number 1 lamp or lighting circuit at the left side of the figure will be referred to specifically, it being understood that each circuit of the group is provided with similar control apparatus, and that any desired number of lighting circuits may be provided and controlled in the manner hereinafter specified. The various circuits may be provided with lamps of different color, preferably white and the three primary colors, red, blue and yellow, thus the footlights would comprise four circuits each having lamps of a color different from those of the remaining circuits of the group.

All of these lighting circuits No. 1 to No. 100, for example, comprise lamp circuits 13 that are supplied with current from supply feed conductors 14 and 15 through the medium of a saturated core reactor 16, having a direct current control winding 17 that influences the reactance of the reactor to vary the voltage of the lamp circuit in response to fluctuations of the current through the control winding in a well known manner.

The current supplied to the control winding of the reactor is controlled by a current control unit 18 such as is disclosed in the United States Letters Patent No. 2,030,801, granted to Robert D. Ross on February 11, 1936, and assigned to the assignee of this application and which comprises a three-electrode vacuum tube so associated with amplifier tubes that variations of the grid potential of the three-electrode tube causes corresponding variations in the output circuit of the amplifier tubes that is connected to the control winding 17 of the reactor through conductors 19 and 21.

In the diagrams the grid conductor that is connected to the grid of the three-electrode tube is designated by the numeral 22 and the positive and negative control circuit conductors are designated by the numerals 23 and 24, respectively, which are connected to the main direct-current generator 25, indicated at the top of Fig. 1.

In the control system illustrated, there are provided one hundred circuits each of which is provided with a grid circuit conductor 22, and there are thirty-six control units for controlling the various grid circuits. Facilities, to be hereinafter described, are provided for selectively placing any desired number of grid circuits under the influence of a selected control circuit, and in the present instance any eight circuits may thus be combined or grouped under the control of a single control unit.

Included in each lighting circuit control are thirty-six grid circuit relays $26^1$, $26^2$ etc. of the over-center spring-held type having two operative positions, namely "closed" position wherein two contacts W and V are closed and contacts X, Y and Z are opened, and "released" position wherein contacts W and V are opened and contacts X, Y and Z are closed. Each relay is provided with an actuating coil 27.

Each of the thirty-six control units includes a normally open multi-contact relay 28 having an actuating coil 29 and a contact-supporting rod 31 having a pair of contact bars 32 and 33 for each of the one hundred circuits. When the coil is energized by momentarily closing of a cross connecting push button switch $34^1$, $34^2$, $34^{36}$ associated with their respective control units, the contact bars 32 and 33 engage their respective contacts $32a$ and $32b$ connected in the circuit containing the grid circuit relay coil 27 and will cause that coil to actuate the grid circuit relay, provided that the circuit is otherwise completed. Whether it is completed will depend on factors of control to be hereinafter described. On a panelboard hereinafter referred to as a cross-connecting panel, are mounted cross-connecting circuit switches 39, one for each circuit and designated specifically as $39^1$, $39^2$, $39^{100}$. The switches are of the single-pole double-throw type having its pivoted blade connected to the negative control feed conductor 24 and adapted to alternatively be moved to "closed" or "released" positions wherein it engages the contacts 41 and 42 that are respectively connected to contacts V of the grid circuit relay 26 and one of the contacts $32b$ of the multi-contact relay 28.

It will be understood that the grid conductor 22 connected to the grid of the three-electrode tube of the control unit 18 may be connected through a variety of control devices interposed between the negative terminal 43 of the generator 25 and the grid terminal of the control unit 18 for the purpose of placing the control of the circuit under the control of different control mechanisms that may function in a variety of combinations or which may be manually or motor operated at different speeds, individually or collectively in predetermined groups.

In order to divide the controlled lighting circuits into groups and to place the grid circuits of the selected lighting circuits under the control of any one of the thirty-six control units, say control No. 1 for example, the cross-connecting circuit switches $39^1$, $39^6$, $39^{12}$, $39^{16}$ etc. are moved to "closed" position. Therefore, the grid circuits of lighting circuits Nos. 1, 6, 12 and 16 are prepared for simultaneous energization as a group under the control of the cross-connecting push button $34^1$. At this time, it is assumed that the contacts W and V of the grid circuit relays $26^1$ of each of the selected circuits are closed and the contacts X, Y and Z open. The grid conductor 22 is then connected to the negative feed conductor 24 through series connected contacts V of all of the grid circuit relays $26^1$ to $26^{36}$.

When the cross-connecting push-button switch $34^1$ for control unit No. 1 is momentarily closed, the coil 29 is energized and the normally-open multi-contact bars 32 and 33 of each of the one hundred circuits to engage their respective contacts. This action causes energization of the grid circuit relay coil 27 through the contact bars 32 which causes all of the relays 26' of the selected circuits associated with the control No. 1 relay 28 to operate and open contacts W and V thereof, the circuit from the positive control feed conductor 23 being through contact bar 32, contact 32ª, coil 27, conductor 45, common to the thirty-six relays of the circuit, conductor 46, contact V of relay 26³⁶ and all of the remaining relays and finally through contact 41 and the "closed" cross-connecting switch 39' to the negative control conductor 24.

Energization of the coils 27 of the No. 1 control units of the selected circuits of the group, as stated above, then opens contacts W and V and closes contacts X, Y and Z of the grid circuit relays. Since the contact V of the relay 26' is then open, subsequent movement of the cross-connecting circuit switches 39 of circuits not originally selected for control unit No. 1 cannot be added to the selected group without again momentarily closing the cross-connecting push button switch 34'.

Since the contact V of the grid-circuit relay 26' is open, the selected circuit cannot at the same time be controlled through any other control unit such as No. 2 or No. 36, because the coil 27 of such relays cannot be energized so long as any one of the series related contacts V are open.

To again close the contacts W and V the switches 39' etc. are moved to release position and when the switch 34' is again momentarily closed, a circuit is established through the coil 27 through bus 24ª, connected to the negative control conductor 24, switch 39', contact 42, bus 42ª common to the 36 relays 26' to 26³⁶, contacts 32ᵇ and bar 33, conductor 33ª, contact X, coil 27, contacts 32ª and bar 32, bus 23ª to positive control conductor 23.

When the contact W is opened the grid circuit is transferred from contact W to contact Z, that is, connected to the bus 47' that is connected in common to all of the contacts Z of the grid circuit relays 26¹ of the No. 1 control unit. The buses 47' to 47³⁶ are connected respectively to second busses 48' to 48³⁶ that are connected respectively to one arm 49 of double-pole double-throw pilot switches 51¹ to 51³⁶ (one for each control circuit means) that are movable to "on" and "off" positions. When this switch is in the "off" position shown, the grid conductors of the associated circuits remain connected to the negative conductor 24 and cannot be influenced through other controls such as the potentiometers to be hereinafter described.

When the pilot switch 51¹, for example, is in the "on" position the grid conductor is connected to the pivoted arm of a single pole double-throw selector switch 52' through conductor 53 and which is alternatively movable to "manual" and "pre-set" positions. At this time the switch arm 54 closes a circuit through a pilot lamp 60 thus indicating that the circuit is now ready for operation.

With the selector switch 52¹ in the manual position the grid circuit includes a conductor 55 that is connected to a movable contact 56 of one of thirty-six individual control potentiometers 57¹, 57², 57³⁶, one end of which is connected to a common negative bus 58 that is connected to the negative control conductor 24 and the other end of each being connected to the moving arm of a sub-group of selector switches 59¹, 59², 59³, 59⁴, 59⁵, etc. The negative bias on the grid circuit at this time is determined by the position of the arm on the potentiometer, assuming that the upper end of the potentiometers 57¹, 57² are connected to the positive conductor 23 through circuits including the switches 59¹, 59², etc.

With the selector switch 52¹ in the "pre-set" position the grid circuit is connected through conductor 61 to protective resistor 62 to normally open relay contacts 63, 64, 65 and 66 of scene flasher relays 67, 68, 69 and 70, respectively, and to the normally closed contact 71 of the fader disconnect relay 72. The actuating coils of the relays 67, 68, 69 and 70 are connected across the positive and negative control conductors 23 and 24 respectively, through the medium of push and pull scene flasher button switches 73, 74, 75 and 76, respectively; and the coil of the normally energized relay 72 is energized through a series of normally closed break contacts 77 connected in series relation and actuated severally by the relays 67 to 70 to open position when any of the said relays are actuated to close the contacts 63, 64, 65 and 66.

The contacts 63, 64, 65 and 66 are connected respectively to four points 63', 64', 65' and 66', respectively, of a scene fader potentiometer 78, and respectively to the movable contacts 63", 64", 65" and 66" of four pre-set potentiometers 79, 80, 81 and 82. The contact arm 83 of the scene fader potentiometer 78 is connected to the protective resistors 62 through the medium of the contact 71.

Thus it will be seen that when the slector switch 52 is in the "pre-set" position the grid circuit is connected through—

(1) A preventive resistor 62, contact 71 of the fader disconnect relay 72, to the moving arm 83 of the scene fader potentiometer 78.

(2) Preventive resistors 62 and contacts 63 of scene flasher relay 67 for scene I, 68 for scene II, 69 for scene III and 70 for scene IV.

It will be understood that the relays 67 to 70 and 72 comprise bars 84 that are actuated by the coils of the relays and are connected to the contacts 63 to 66, 77 and 71, so that said contacts of all circuits are actuated simultaneously by the bars 84.

The function of the scene fader is to accomplish a gradual and proportional transition from one scene to the next succeeding scene. This is accomplished as follows.

With the grid wire connected to the moving arm 83 of the scene fader potentiometer 78, and this arm on position 63' for scene 1, a negative potential is applied to the grid circuit depending upon the position of the movable arm 63" of pre-set potentiometer 79 for scene 1, the lower end of which is connected to the negative control feed conductor 24.

Moving the arm of the scene fader from position 63¹ (scene 1) to position 64' (scene 2) gradually changes the potential impressed on the grid circuit from that previously set up on pre-set potentiometer 79 (scene 1) to that pre-set on potentiometer 80 (scene 2).

Assuming operation on scene 1 and that it is desired to transfer instantly to the scene 3 operation, upon depressing the scene flasher push button 75 which energizes the coil of the relay 69, the contact 65 thereof is instantly connected to the moving arm 65" of the potentiometer 81 (scene 3) and the contact 77 of that relay opened, thus interrupting the circuit through it to open its contacts 71. This last operation disconnects the grid wire from the moving arm of the fader leaving it connected through the scene flasher relay contacts 65' of the relay 69 (scene 3).

To restore operation of the fader, scene flasher button 75 is pulled out, thus deenergizing the scene flasher relay 69 (scene 3) and disconnecting the grid wire from the moving arm 65'' of pre-set potentiometer 81 (scene 3), at the same time closing the break contact 77 of that relay thus completing the circuit through the operating coil of the fader disconnect relay, causing it to close its contacts, thus again connecting the grid wire to the moving contact 63'' of pre-set potentiometer 79.

To flash from scene 3 to scene 4 pre-sets without utilizing the fader, depress scene flasher pushbutton 76 (scene 4) and pull the previously closed pushbutton 75 (scene 3). This operation closes scene flasher relay 70 and connects the grid conductor to the moving arm 66'' of the pre-set potentiometer 82 and disconnects it from the potentiometer 81 (scene 3).

It will be understood that the resistance of the scene fader potentiometer 78 is sufficiently light to allow changing the pre-set potentiometers of the scenes not in use without effecting a change in the scene in progress.

So far, it has been shown in what manner any number of circuits may be placed under the control of one of the thirty-six control units and the manner in which the light intensity of the selected circuits may be pre-set for four scenes and the manner in which the control units may be individually operated at will to vary the negative grid potential on the tube control units to produce desired light intensity variations.

It will now be shown how the thirty-six control units may be operated individually or in groups of four through any one of nine sub-group potentiometers or how any number of control units may be controlled through any one of four group master potentiometers, or in what manner any one or all of the four group master potentiometers may be controlled by a grand master potentiometer which controls the generator voltage of the control circuit.

The manner in which the circuits are to be controlled is primarily dependent upon an interlocking selector switch 85 shown in Figs. 10 and 11 (one for each of the thirty-six control units) the switch comprising an "individual" switch 86, a "grand master" switch 87 and four "group master" switches $88^1$, $88^2$, $88^3$, $88^4$. Each switch includes a normally open contact 89 and a normally closed contact 91, the latter contact of all of the switches being connected in series relation.

The construction of the interlocking switch 85 is such that when a control button of any switch $88^1$, $88^3$ etc. is pushed in to close its respective normally open contact 89 and open its respective normally closed contact 91, any other button that is then in the "in" position will be forced out to its original position. It will be seen, therefore, that a circuit can be influenced by one only of the above referred to control devices at any one time.

It will be understood that the sub-group selector switches $59^1$, $59^2$, etc., the movable contacts of which are connected to the positive end of the individual potentiometers $57^1$ and $57^2$ etc., respectively, are normally in the "on" or closed position wherein the positive ends of the individual potentiometers are connected to their respective interlocking switches 85 through conductors 92.

To obtain control of the circuits connected to a selected individual potentiometer, as for example, $57^1$ the button of its respective "individual" switch 86 is depressed opening contact 91 and closing contact 89.

The potentiometer $57^1$ is then connected across the negative and positive control conductors through negative control bus 58, potentiometer $57^1$, closed switch $59^1$, conductor 92, contact 89 to the positive individual bus 93. The negative bias on the grid control conductor 55 is then dependent upon the position of the movable contact 56 on the potentiometer $57^1$. If the contact 56 is at the negative end of the potentiometer, the negative bias is maximum and the lamps of the lighting circuits are "black out." The degree of illumination will therefore be dependent upon the position of the contact 56 and full illumination of the lamps of the lighting circuits will be obtained when the contact 56 is near the positive end of the potentiometer $57^1$.

Should it be desired to place selected individual control potentiometers $57^1$, $57^2$, etc. under the influence of any one of four group master potentiometers $94^1$, $94^2$, $94^3$, or $94^4$, for example, $94^1$, the button of the group master switch 88' of each selected control potentiometer is depressed, closing the contact 89 thereof and opening the contact 91. This action automatically returns the "individual" switch 86 to its original "out" position. Under this condition, the positive ends of the selected potentiometers are connected to the positive control conductor 23 through the following circuits, conductor 92, contacts 91 of interlocking switches 86 and 87, contact 89 of switch 88', group master bus 95', conductor 96', movable contact 97', group-master potentiometer 94', normally open group master switch 98', which when closed connects the positive end of the potentiometer 94' to the positive bus 99 connected to positive control conductor 23.

Thus all or any of the 36 potentiometers $57^1$, $57^2$, etc., may be connected to and controlled by any one of the four group master potentiometers $94^1$, $94^2$, $94^3$ or $94^4$ when its respective "group master" switch is in the closed or "individual" position, wherein the positive end of the potentiometer is connected to the positive bus 99.

The four "group master" potentiometers $94^1$, $94^2$, etc., may be selectively or collectively controlled by a "grand master" potentiometer 101 that is connected across the positive and negative control conductors 23 and 24, respectively, by moving the group master switches $98^1$, $98^2$, $98^3$ and $98^4$ to the "master" position wherein the positive ends of the group master potentiometers $94^1$, $94^2$, etc., are connected to a bus 102 that is connected to the positive grand-master generator bus 103. The bus 103 is connected to the positive terminal 104 of the grand master generator 105 and potentiometers $94^1$, $94^2$, etc., are connected to a bus 102 that is connected to the positive grand-master generator bus 103. The bus 103 is connected to the positive terminal 104 of the grand master generator 105 through bridging contact 106 of a "black-out" contactor switch 107. A movable contact 108 connected to the field winding 109 of the generator 105, slidably engages the potentiometer coil 101 and determines the voltage output of the generator 105, thus effecting the negative bias of the grid wires 55 that are then controlled through individual control potentiometers $57^1$, $57^2$, etc., and group master potentiometers $94^1$, $94^2$, etc.

The individual control potentiometers $57^1$, $57^2$, etc., may be grouped in groups of four each and thus selectively or collectively controlled in groups of four through one of nine sub-group potentiometers $111^1$, $111^2$, $111^3$, etc., by connecting the positive ends of the potentiometers of $57^1$, $57^2$, $57^3$ and $57^4$ to potentiometer $111^1$, potentiometers $57^5$, $57^6$, $57^7$ and $57^8$ to potentiometer $111^2$, etc. This is done by moving the sub-group selector switches $59^1$, $59^2$, etc., of desired control potentiometers $57^1$, $57^2$, etc., to the "sub" position, or from the normal "interlock" position shown in Fig. 1 to the left hand position wherein the positive ends of the potentiometers $57^1$, $57^2$, etc., are connected to the through conductors 112 to the movable contacts $113^1$, $113^2$, etc., that slidably engage the sub-group potentiometers $111^1$, $111^2$, etc., respectively, having their negative ends commonly connected to the negative bus 114 that is connected to negative control conductor 24, and having their positive ends connected to pivotal sub-group potentiometer or to switches $115^1$, $115^2$, $115^3$, etc., that may be moved by the foot of the operator to connect the potentiometers direct to the positive bus 116 that is in turn connected to the positive feed conductor 23, or to a bus 117 that is connected to the positive generator bus 103.

When the potentiometers are connected to the positive conductor 23 as in the first-mentioned instance, the grid control wire 55 is controlled through the individual potentiometers $57^1$, $57^2$, etc., and the sub-group potentiometers $113^1$, $113^2$, etc., and when the individual potentiometers are connected to the positive generator bus 103, the control is extended to the "grand master" generator 105 which effects changes in voltage in the positive conductor dependent upon the position of the moving contact 108 of the grandmaster potentiometer 101 which controls the field winding of the generator.

Thus it will be seen that the lighting circuits are controlled by the negative bias imposed on a grid wire of a three-electrode tube which in turn controls an A. C. amplifier which rectifies its output and controls a saturated core reactor. The negative bias of any number of grid wires may be placed nuder the control of any one of thirty-six control potentiometers, and the potential across these potentiometers may be selectively varied either through sub-group potentiometers or group master potentiometers, selectively supplied with current from either of two generators, one of which, the generator 105, effects variations in potential through potentiometer control of the field winding and the other, generator 25, effects variations in potential supplied to the control conductors 23 and 24 through a variable resistance 118 interposed in the circuit of its field winding 119.

The switchboard apparatus containing the various control devices referred to above, comprises a console 121 of the general pipe organ type having side panels 122 and 123, a stepped front panel 124, and a lower front panel 125 as shown in Figs. 4 and 5. Considering the circuit control devices in the order in which they were referred to above, the control switches $34^1$ to $34^{36}$ are mounted on the front panels 124 Figs. 5 and 9, and the cross connection circuit switches $39^1$ to $39^{100}$ are mounted on the side panel 122 on opposite sides of the console and adjacent their respective pilot lamps 40 which are energized when the contacts $y$ of the relays $26^1$ to $26^{36}$ are closed, and which, momentarily indicate, upon momentary closure of a press button pilot lamp switch 50 on the front panel adjacent each cross connecting panel switch $34^1$, $34^2$, etc., what circuits are connected thereto.

Directly above the cross connecting panel swtches and on the sub-panel 126 upon which they are mounted, Figs. 9 and 11, the "pilot switches" $51^1$ to $51^{36}$ of the control circuits are mounted. These switches are provided with the legends "On" and "Off" and when in the "off" position, the grid conductors 22 of the circuits associated with their respective control circuits are connected directly to the negative conductor 24, as before described, and cannot be influenced by other control devices such as potentiometers, etc. When the pilot switches $51^1$ to $51^{36}$ are in the "on" position, they connect the grid conductors to the single pole, double throw "selector switches" $51^1$ to $52^{36}$ that are mounted on the sub-panel 128 and provided with the legends "Pre-set" and "Manual." When the "selector switch" is in the manual position, the grid conductors of the associated circuits are connected to the movable contacts 56 of their respective control potentiometers $57^1$ to $57^{36}$ mounted on the sub-panel 132 Figs. 10 and 11, and when the "selector switch" is in the "preset" position, the grid conductors are connected to the "scene flasher" relays 67, 68, 69 and 70, Fig. 2 that are controlled by the "scene flasher push buttons" 73 to 76, Figs. 2 and 9, mounted on the center section of the sub-panel 128. The scene flasher relays are associated with the "scene fader potentiometer" 78, one for each control circuit, mounted behind the front panel 124 as will hereinafter appear.

The "scene fader" is associated with movable contacts 63″ to 66″ of the four pre-set potentiometers 79 to 82, Figs. 1 and 11, of each control circuit, which are mounted on the sub-panel 127, Figs. 9 and 11.

The thirty-six interlocking selector switches 85, Figs. 2 and 11, are mounted upon the panel 129, and may comprise a plurality of push buttons, for example, 86, which is shown in its depressed position. A rod 135 connected thereto carries a frusto-conical cam 136 and the two switch contacts 89 and 91, the former of which is normally open and the latter of which is normally closed. A slide bar 137, biased toward the right by a leaf spring 138 is provided with holes 139 of slightly larger diameter than the cam 136. As shown, button 86 is depressed and the spring 138 has so moved the bar 137 that the upper side of the cam 136 engages the bar. When any other button 87, $88^1$, etc., is depressed, the cam 136 thereon displaces the bar toward the left as the cam 136 moves through the associated hole 139, and thereby releases the cam 136, permitting a spring 141 to return the button 86 to its original position. Thus, when any other button is depressed, the button 86 will be released, etc.

When the button 86 marked "Ind" for individual is depressed the grid wires of the associated circuits are controlled through the individual potentiometers $57^1$, $57^2$, etc., of the control circuits.

With any one of the buttons $88^1$, $88^2$, $88^3$ or $88^4$ depressed, the grid wires of the associated circuits are controlled through the corresponding one of the four group master potentiometers $94^1$, $94^2$, $94^3$ or $94^4$, Figs. 3, 5 and 8, mounted behind the front panel 124, as shown in Fig. 5 and adapted to be separately operated manually, through hand wheels 142, 143, 144 and 145, respectively, Figs. 4 and 8, which turn worms 146, geared to clutches 147, 148, 149 and 150, respectively, diagrammatically illustrated in Fig. 3.

The group master potentiometers 94¹, 94², 94³ and 94⁴ may be selectively, individually or collectively driven by a motor through magnetic clutches 151, 152, 153 and 154, respectively, which serve to connect them to a shaft 155 that is driven by a motor 156 in a manner to be hereinafter described. Double throw group master clutch switches 157¹, 157², 157³ and 157⁴, Figs. 3 and 10, marked W for hand wheel operation and M for motor operation, serve to control the energization of the magnet clutch and determine in what manner the group master potentiometers are to be operated, and the group master potentiometers may be selectively operated when the group master switches 98¹ to 98⁴ are in their individual position marked Ind.

The four group master potentiometers may be selectively or collectively controlled, as previously stated by a grand master potentiometer 101, Figs. 3, 6 and 8, by moving such group master switches 98¹, 98², 98³ and 98⁴, Fig. 1, to the master position, as are desired to be controlled by the grand master potentiometer. This operation places the sub-group potentiometers under the influence of the grand master generator 105 which varies the voltage in the circuit through varying the current conditions in the field winding of the generator.

As previously stated, the individual potentiometers 57¹, 57² to 57³⁶ may be grouped in groups of four each and thus selectively or collectively controlled through one of nine sub-group potentiometers 111¹, 111² to 111⁹ by moving the sub-group selector switches 59¹, 59², etc., of panel 133, Figs. 10 and 11 of desired control potentiometers, to the "Sub" position wherein the positive ends of potentiometers 57¹, 57², etc., are connected through conductor 112 to the variable contacts 113¹, 113², etc., that slidably engage the sub-group potentiometers 111¹, 111², etc. These sub-group potentiometers may be controlled in turn by the grand master potentiometer 101 which controls the voltage of the generator 105, by means of the sub-group potentiometer toe switches 115¹, 115², to 115⁹, Figs. 1 and 4 and 5 which either connect the positive ends of the sub-group potentiometers to the positive control conductor 23 direct, or to the positive terminal of the generator 105.

A house master potentiometer 158 is mounted for operation by the motor driven shaft 155 when connected thereto by a magnet clutch 159 and for operation by a hand wheel 161 which turns a worm 162 that drives a magnet clutch 163 which connects house master potentiometer to the hand wheel drive. The motor and hand wheel clutches 159 and 163, respectively, are controlled by a double throw switch 164 in the panel 129 having motor and wheel positions having the legends M and W, respectively.

The grand master potentiometer 101 is mounted for operation by the motor driven shaft 155 when connected thereto by a magnet clutch 165, Figs. 3 and 6, and for operation by a grand master hand wheel 166 which turns a worm 167 that drives a magnet clutch 168 which connects the grand master potentiometer to the hand wheel drive. The motor and hand wheel clutches 165 and 148, respectively, are controlled by a double throw switch 169 having motor and wheel positions having the legends M and W, respectively.

The house master potentiometer 158, group master potentiometers 94¹, 94², 94³ and 94⁴ and the grand master potentiometer 101 are adapted to be operated by means of foot pedals 172¹, 172², 172³, 172⁴ and 173, respectively, pivoted on the console as indicated in Figs. 7 and 8 and connected to the potentiometers through linkage 174 and 175 and rods 176 having loop chains 177 engaging a pinion 178 on the potentiometers in the usual manner. The potentiometers may be rotated in both directions by rocking the foot pedals.

The sub-group potentiometers 111¹ to 111⁹ are adapted to be operated by pivotally mounted foot pedals 181 to 189, Figs. 4 and 5, through the medium of the linkage 191 and the rods 192 which are provided with loop chains 193 that encircle the pinions 194 which are connected to the sub-group potentiometer as previously stated, four control circuits may be selectively or collectively controlled by means of one of the sub-group potentiometers.

The scene fader potentiometers 78, thirty-six in number, are disposed on opposite sides of a scene fader drive-shaft 195, Figs. 6 and 7, that is adapted to be connected to a motor-drive to be hereinafter described, by means of a magnet clutch 196 or to be connected to the grand master hand wheel 166 by a magnet clutch 198. Also a scene fader hand wheel 197, Figs. 4 and 8, is permanently connected to the shaft 195 by a bevel gear 199 that is driven by a pinion 201, and a driving rod 202 provided with universal joints 203, Figs. 6 and 8.

The scene fader potentiometers 78 are mounted in a frame 204 on the upper rear portion of the console 121, and the movable contact arms 83, Fig. 2, of each are provided with a gear 205 that meshes with a gear 206 on the scene fader drive shaft 195 as shown in Figs. 6 and 7. Rotation of the shaft 195 causes rotation of the scene fader contact arms 83 to any desired position. When it is desired to move the scene fader contact arms at a very slow rate, the clutch 198 is energized by moving the double-throw scene fader switch 207 on the panel 208, Fig. 9, to the W or grand master hand wheel position, thus establishing a driving connection between the scene fader shaft 195 and the hand wheel 166. To drive the scene fader shaft 195 by motor, the switch 207 is moved to M position wherein the magnet clutch 196 is energized, thus connecting the shaft 195 to a motor drive to be hereinafter described.

As indicated in Figs. 6, 7 and 8, the grand master hand wheel 166 is connected to the magnet clutch 198 by means of a chain 209 that meshes with pinions 211 and 212 on the worms 167 and 213 respectively, the latter meshing with a worm wheel 214 fixed to the clutch 198.

Referring to Figs. 5, 6, 7 and 8, the motor drive for the group and grand master potentiometer shaft 155 and the scene fader drive shaft 195 comprises a motor 156 mounted upon a base 246 of the console 121, that drives two gears 217 and 218 at different speeds through a gear train 219 and 221 connected to the motor by a belt 222. For example, the gear 217 has a 1 to 600 ratio with the motor and is termed the high speed gear, and the gear 218 has a 1 to 5700 ratio with the motor and is termed the low speed gear. As no claim is made to the specific form of gear train employed, the train is not illustrated in detail, nor is it more minutely described.

The high speed gear 217 is connected to the high speed clutch 223 by means of a chain 224 and the low speed gear 218 is connected to a low speed clutch 225 by a chain 226, the latter clutch being in turn connected to the scene fader clutch 196 by a chain 227. The clutches 223 and 225 are controlled by a double-throw speed selector clutch switch 228 having "Fast" and "Slow" positions for selectively energizing the clutches to obtain a desired driving speed for the shafts 155 and 195.

The control for the driving motor 156 is not shown in the diagram, Figs. 1 and 2, but may have any preferred form of speed control regulated by a rotary control handle 229 on the panel 129, Fig. 10. Therefore, any desired driving speeds may be obtained for shafts 155 and 195 within certain limits.

Referring now to the motor-generator apparatus, Fig. 1, the main generator 25 and the grand master generator 105 are driven by motor 231 supplied with current from a feed circuit 232 having a main contactor switch 233 actuated by a magnet coil 234 that is energized through the medium of the starting contactor switch 235 having a magnet coil 236 connected across the positive and negative control conductors 23 and 24 respectively and controlled by a starting switch 237 that is so connected to a "black-out" switch 238 by a rocking-beam 239 that when one switch is closed the other is opened. The switch 238 controls the magnet winding 239 of the "black-out" contactor switch 106, which in turn controls the circuits supplied by the generators 25 and 105. A battery 241 normally energizes the control circuits 23 and 24 and supplies current to the winding 236 for actuating the starting contactor switch 235.

*Operation*

To start operation, all potentiometers and the generator rheostat 118 may be set to effect full brilliancy, except those potentiometers of each circuit that are preset for effecting predetermined light intensities for different scenes, or those potentiometers that control circuits in which other than full brilliancy is desired.

The starting switch 237, Figs. 1 and 10, is first moved to "on" position, thereby energizing the starting contactor switch 235 and causing the main contacts to close. This starts the motor 231, which drives the generator 25 and 105, thus energizing the control circuits.

Assuming that it is desired to place any eight lighting circuits on a single control circuit means, for example, control No. 1—

First.—Move the selected eight circuit switches 39¹, 39², 39⁶, etc., on the cross connecting panel 122 to the "close" position.

Second.—Momentarily press cross connecting panel push button switch 34¹ for control circuit No. 1, energizing winding 29 of the multi-contact relay 28, thereby closing the eight grid relays 27 of the circuits completed by the eight closed circuit switches 39¹, etc.

Closing of the grid relays sets or prepares circuits through cross connecting panel pilot lamps 40, so that they indicate the connected circuits when the pilot lamp switch 50 of control circuit No. 1 is closed momentarily.

Th'rd.—Determine whether circuits on control No. 1 are to be controlled individually by circuit No. 1, control potentiometer 57¹ or grand master potentiometer 101 or one of the four group potentiometers 94¹ to 94⁴, or its respective sub-group potentiometer actuated by foot pedals.

Fourth.—If it is determined that the circuits are to be controlled by the individual control potentiometer No. 57¹, A.—Press down the individual button 86 marked ("Ind.") on the interlocking selector switch group 85.
B.—Determine whether to be operated manually or by preset.
C.—If determined to operate by preset, the selector switch 52¹ is moved to "preset" position.
D.—If determined to operate manually and individually—the selector switch 52¹ is moved to "manual" position.
E.—To finally complete the circuit, the pilot switch 51 is moved to "on" or closed position.

If it is desired to operate manually as in paragraph D with the selector switch 52¹ in the manual position, No. 1 control circuit individual potentiometer 57¹ may be operated and the eight selected circuits may be brought from "black-out" to full bright as desired by moving the movable contact 56 thereof that is connected to the grid conductor.

If it is desired to operate by "preset" as in paragraph C—

First.—Set up the sliders or movable contacts 63″, 64″, 65″ and 66″ on preset potentiometers 79, 80, 81 and 82 respectively, of the No. 1 control circuit, to effect the desired light intensities for the four separate scenes.

Second.—To start on scene 1, the scene fader, of the No. 1 circuit, (mounted for motor or hand wheel operation) is turned either manually or by motor to the scene 1 position as indicated by preset indicator dial 242.

The indicator arm is actuated by a volt meter and a rheostat 243 having a contact arm 244, varies voltage in the meter in accordance with the position of the feeder arm.

Third.—Move selector switch 52′ to "preset" position.

The eight selected circuits for scene 1 will be energized in accordance with the "preset" slider button position on the preset potentiometers.

The circuits may be manually varied if desired during a scene by moving the "preset" slider buttons.

To fade or blend the lighting effect of scene one to that set for scene two, manually—

(a) The scene fader hand wheel 197 which is connected to the scene fader drive shaft at all times, is rotated, or
(b) The scene selector switch 207, Figs. 3 and 9 is moved to the W or wheel position, thereby connecting the scene fader drive shaft to the "grand masters" hand wheel 166 by means of the magnet clutch 198.

All circuits connected to the No. 1 control circuit will be slowly effected by movement of the "grand master" hand wheel which turns the fader drive shaft at a slower speed than the hand wheel 197, it requiring about twelve turns of the grand master hand wheel to cause one revolution of the fader arm. Therefore, the grand master hand wheel is used to obtain very gradual changes in light intensities of the associated circuits.

The lighting circuits associated with the No. 1 control circuit may be influenced at this time if desired by either the preset potentiometers 79, 80, 75

81 and 82 or the individual potentiometer 57', depending on the position of the selector switch 52.'

To obtain motor operation of the scene fader drive shaft—

*First.*—Determine the speed of scene fader operation desired, by moving the speed selector clutch switch 228 to the "fast" or "slow" position and a fast or slow speed will result. The fast and slow magnet clutches 223 and 225 on the shaft 155 continually operate at fast and slow speeds respectively and when energized connect the clutches to the shaft 155, depending upon the position of the scene fader. The shaft 155 is connected through sprockets and a chain 227 to the motor drive fader clutch 196, and consequently the latter clutch is driven, at a speed corresponding to that at which the shaft 155 is driven by the fast and slow clutches 223 and 225, respectively.

*Second.*—Move scene fader switch 207 to M position which energizes the magnetic clutch 196 and connects the scene fader drive shaft to the motor drive.

*Third.*—Move motor reversing switch 245 to F position for forward operation, or to R for reverse operation, as desired.

*Fourth.*—Stop the scene fader by moving the scene fader selector switch to the "off" or vertical position, thus de-energizing the magnet clutch 196. To stop the motor, move the motor switch 245, Fig. 10, to control or neutral position.

In order to flash from one scene to another without fading through the successive scenes, and assuming that it is desired to obtain the illumination preset for scene 1, regardless of the scene fader position—

*First.*—Press scene flashover button No. 73 on the center of the panel 128, Fig. 9, which connects scene No. 1 Flashover relay 67 in circuit, thereby operating the relay and opening the scene fader arm by opening the fader cut-out switch 71 as previously described.

*Second.*—To flash to any other scene press corresponding scene flashover button 73 to 76 and pull out the previously closed button. The setting for the selected scene will then control the associated light circuits.

Returning now to the second above mentioned alternative method of control for the circuits associated with a control circuit, namely, control by the grand-master potentiometer—

*First.*—Press down the grand master button 87 of the interlocking switch 85.

*Second.*—Determine whether to be under preset control or individual manual control—

(a) If individual control—The individual potentiometer must be set for maximum light intensity required in the circuits governed by that control circuit.

(b) If determined to operate under preset, the preset buttons 63 to 66 for the four scenes will be preset as desired.

*Third.*—Move pilot switch 51, for No. 1 control circuit on panel 126 to "on" position to complete setting up of that control circuit.

*Fourth.*—Operation of the grand master potentiometer will effect all connected circuits by varying the field current of the grand master generator and thus effects the light intensity of all of the then energized circuits. The illumination will start at the brilliancy determined by presets if all of the resistance of the grand masters is out.

As the field current is varied to reduce the voltage of the control circuit, the brilliancy will diminish correspondingly from the brilliance initially determined by the preset potentiometers.

*Fifth.*—Since the grand-master potentiometer may be operated by foot pedal at all times, and by motor or by hand wheel, determine what method of operation is desired.

(A) If determined to operate by hand wheel, throw grand-master switch 169, panel 129, Fig. 10 to W or wheel position, thereby connecting the grand-master hand wheel to the grand-master potentiometer 101 through the magnet clutch 168, Fig. 3.

(B) If determined to operate grand-master potentiometer by the motor, (a) Move the grand-master switch 169 to M or motor position and select speed by moving the speed selector switch 228 to the desired speed. "Fast" or "slow," thus connecting the potentiometer shaft 155, Fig. 3, to the desired fast or slow driving clutch 223 or 225.

(b) Move the motor switch 245 to the U or up-position if it is desired to increase the intensity of illumination or to the D or down-position if it is desired to diminish the illumination.

*Sixth.*—To stop the grand-master potentiometer, move the grand-master switch 169 to vertical position.

*Seventh.*—Since the grand-master potentiometer 101 is connected to a foot pedal 170 at all times, it may be actuated at will by rocking the pedal with the foot.

Referring now to the third previously mentioned alternative method of controlling the lighting circuits associated with a control circuit, namely, by the group-master potentiometers which may be operated by hand-wheel, foot-pedal or motor.

*First.*—Select a group-master, say No. 1 and determine the manner of operation of the group-master potentiometer.

(A) Press down button 88¹ in interlocking switch 85, panel 129, Fig. 10, thereby connecting the group-master potentiometer to any control circuits in which No. 1 group-master key is pressed down.

*Second.*—Determine whether to be under preset control or individual manual control.

(A) If individual manual control, the individual potentiometer 57¹ must be set for maximum light intensity required in the circuits governed by that control circuit and the switch 98 is then moved to "ind" or independent position.

*Third.*—If determined to operate under preset control, the (A) Preset buttons 63 to 66 for the four scenes thereof will be preset as desired.

(B) Move pilot switch 51, for No. 1 control circuit on panel 126 to "on" position to complete setting up of that control circuit. Movement of the group-master potentiometers will then cause variations in the illumination of circuits associated with the control circuits whether controlled through preset or individual-manual control.

To obtain motor operation of the group-master potentiometer.

(A) Determine the speed of group-master potentiometer desired, by moving the speed selector clutch switch 228 to the fast or slow position. The drive shaft 155 will be connected to the motor in the manner described in connection with the motor drive of the scene-fader potentiometers.

(B) Move the group-master switch 157¹ to M or motor-switch position thereby energizing the magnet clutch 151 and connecting the No. 1 group-master potentiometer to the drive shaft 155.

(C) Move the motor reversing switch 245 to F position for forward operation, or to R position for reverse operation as desired.

(D) Stop the group-master potentiometer by moving the group-master switch 157¹ to neutral position.

To obtain hand-wheel operation, move the switch 157' to W or wheel position and turn the hand wheel.

To operate the group-master potentiometer No. 1 by foot-pedal, simply rock the pedal 174¹.

To operate the group-master potentiometer or a plurality thereof through the grand-master potentiometer.

(A) Move the selected group-master switches 98' to 98⁴ to "master" position.

(B) Operate the grand-master potentiometer by motor, hand-wheel or foot pedal as before described.

To control the selected circuits by means of the sub-group master potentiometers.

(A) Press in the lower part of the sub-group selector switch 59¹ to 59⁴ of the control circuits to be placed under the control of the sub-group potentiometer 111¹, switches 59⁵ to 59⁸ to be placed under the control of the sub-group potentiometers 111², etc. The circuits through the interlocking group-master switches are thus opened, and the circuits through the sub-group potentiometers closed.

(B) Operate the selected sub-group potentiometers by rocking the foot pedals 181 to 189.

(C) The sub-group potentiometers may be connected through the toe switches 115¹, 115², etc., to the grand-master potentiometer or to a positive side of the control feed conductor as hereinbefore described.

It will be understood that the lighting circuits may be provided with lamps of different colors, for example, white and the primary colors, red, blue and yellow and that circuits having white lamps may be grouped under the control of certain control circuits, those having red lamps may be grouped under the control of other control circuits and so on. The color of the circuits under a certain control circuit is indicated by the permanent pilot lamp mounted beneath ground glass colored plates in the panel 131.

It will be apparent from the foregoing that any desired lighting effects may be produced at the will of the operator, and changed at various speeds to other effects. Concentration of the controls in a console places all of the controls within the reach of the hands and feet of the operator without necessitating movement of the operator from a bench or seat.

While but one control switchboard is disclosed for controlling the lighting circuits of an auditorium or theater, it is obvious that many changes, alterations and additions may be made in the apparatus disclosed without departing from the spirit of the invention.

We claim as our invention:

1. A theater lighting system comprising a plurality of lighting circuits, a plurality of control circuit means, means for varying the voltage therein, a control means for each lighting circuit responsive to variations in voltage in an associated control circuit means, and means including selector means individual to each control means and switching means individual to each control circuit means for selectively connecting the control means to any selected control circuit means and for preventing its connection to any other control circuit means.

2. A theater lighting system comprising, a plurality of lighting circuits, a plurality of control circuit means, means for varying the voltage therein, a control means for each lighting circuit responsive to variations in voltage in an associated control circuit means, means individually to each lighting circuit for preparing its associated control means for connection to any selected control circuit means, switch means individual to each control circuit means for connecting the prepared control means to the selected control circuit means, and means for preventing the connection of any control means to another control circuit means after it is connected to a selected control circuit means.

3. A theater lighting system comprising, a lighting circuit, a control means therefor responsive to variations in voltage for effecting variations in the voltage of the lighting circuit, a current supply source, a plurality of potentiometer elements disposed to be connected between said source and the said control means, means for varying the voltage of the said source, means for varying the resistance of the potentiometer elements, and means whereby the potentiometer elements may be separately interposed in the circuit between the said supply and the said control means or interposed therein in series relation.

4. A theater lighting system comprising, a plurality of lighting circuits, a control means for each circuit responsive to variations in voltage to effect variations in the voltage of the lighting circuit, a plurality of voltage varying devices, a plurality of control circuit means, means whereby the control means for each circuit may be selectively connected to the control circuit means, means whereby the control circuit means may be selectively connected to the voltage varying devices a plurality of different operating devices for operating the voltage varying devices, and means including electro-responsive clutches for selectively connecting the voltage varying devices to any selected operating device.

5. A theater lighting system comprising, a plurality of lighting circuits, a control means for each circuit responsive to variations in voltage to effect variations in the voltage of the lighting circuit, a plurality of voltage varying devices, a plurality of control circuit means, means whereby the control means for each circuit may be selectively connected to the control circuit means, means whereby the control circuit means may be selectively connected to the voltage varying devices, operating means for the voltage varying devices including a handwheel and a motor, and means including electro-responsive clutches and selector switches for selectively and operatively connecting the voltage varying devices to any of the said operating means.

6. A theater lighting system comprising, a plurality of lighting circuits, a control means for each circuit responsive to variations in voltage to effect variations in the voltage of the lighting circuit, a plurality of voltage varying devices, means whereby the circuits may be selectively connected to the said devices, operating means for the voltage varying devices including a foot pedal permanently connected thereto, a handwheel and a motor, and means for selectively and operatively connecting the voltage varying means to the handwheel or the motor.

7. A theater lighting system comprising, a plurality of lighting circuits, a control means for each circuit responsive to variations in voltage to effect variations in the voltage of the lighting circuit, a plurality of voltage varying devices, a plurality of control circuit means, means whereby the control means for each circuit may be selectively connected to the control circuit means, means whereby the control circuit means may be selectively connected to the voltage varying devices, a plurality of different operating devices including manually-operable means and motor-driven means for operating the voltage varying devices, and current responsive clutch means for selectively connecting the voltage varying devices to any selected operating devices.

8. A theater lighting system comprising, a plurality of lighting circuits, a plurality of control circuit means therefor, a control means for each circuit adapted to vary the voltage thereof in accordance with the energization of a control circuit means associated therewith, means for varying the energization of the control circuit means, means for each lighting circuit for individually connecting the control means of a lighting circuit to any control circuit means, a plurality of relays for each lighting circuit each individual to a control circuit means, each having series related contacts and an electro-magnet for moving the relay to its two operative positions, and means including a switch and the series related contacts of the said relays of a lighting circuit for closing the circuit through an electromagnet of the relay of a lighting circuit connected to a selected control circuit means, for connecting the control means of that circuit to the selected control circuit means.

9. A theater lighting system comprising, a plurality of lighting circuits, a control means for each circuit responsive to variations in voltage to effect variations in the voltage of the lighting circuit, a plurality of voltage-varying devices, means whereby the circuits may be selectively connected to the said devices, operating means for the voltage varying devices including a foot pedal permanently connected thereto, a hand wheel, a motor-driven means having a plurality of driving elements operated at different speeds, means for selectively and operatively connecting the voltage varying means to the hand wheel or the motor-driven means, and means for selectively connecting the voltage-varying means to the said driving elements, whereby the voltage may be varied at different speeds.

10. A theater lighting control system comprising, a plurality of lighting circuits, current responsive means for controlling each lighting circuit, a control circuit for energizing each current responsive means, a plurality of control conductors, means operable to selectively connect said control circuits to any one of said control conductors, a voltage-varying device individual to each control conductor, a grand master voltage varying device, a plurality of group master voltage varying devices, and switch means associated with each control conductor operable whereby the energization of the control conductors may be individually controlled by their individual voltage varying devices only, collectively controlled by any one of the group master voltage varying devices or by the grand master voltage varying device independently of the group master potentiometers.

11. A theater lighting control system comprising, a plurality of lighting circuits, current responsive means for controlling each lighting circuit, a control circuit for energizing each current responsive means, a plurality of control conductors, means operable to selectively connect said control circuits to any one of said control conductors, a potentiometer individual to each control conductor for individually controlling the lighting circuits connected thereto, a plurality of group potentiometers for controlling the lighting circuits connected to a plurality of control conductors, a plurality of sub-group potentiometers each associated with a predetermined number of control conductors, switch means associated with each control conductor selectively operable to render the energization of the control conductors dependent upon the operation of the individual potentiometers only and to render any one of the group potentiometers effective to control the energization of a selected group of control conductors, and additional switch means operable to render the sub-group potentiometers effective to control the energization of their associated groups of control conductors.

12. A theater lighting control system comprising, a plurality of lighting circuits, current responsive means for controlling each lighting circuit, a plurality of control conductors for energizing the current responsive means, means operable to selectively connect the current responsive means to said control conductors, an individual potentiometer for varying the voltage of each control conductor to control the lighting circuits connected therewith, a plurality of group master potentiometers, a grand master potentiometer, switch means associated with each control conductor operable to selectively render their energization individually responsive to the operation of the individual potentiometers, collectively responsive to any one of the group master potentiometers or collectively responsive to the operation of the grand master potentiometer, a sub-group potentiometer associated with predetermined groups of individual potentiometers, and switch means associated with each sub-group potentiometer selectively operable to render the energization of control conductors associated with the groups of individual potentiometers collectively dependent upon the operation of the sub-group potentiometers.

13. A theater lighting control system comprising, a plurality of lighting circuits, current responsive means for controlling each lighting circuit, a plurality of control conductors for energizing the current responsive means, means operable to selectively connect the current responsive means to said control conductors, an individual potentiometer for varying the voltage of each control conductor to control the lighting circuits connected therewith, a plurality of group master potentiometers, a grand master potentiometer, switch means associated with each control conductor operable to selectively render their energization individually responsive to the operation of the individual potentiometers only, collectively responsive to any one of the group master potentiometers or collectively responsive to the operation of the grand master potentiometer independently of the group master potentiometer, a sub-group potentiometer associated with predetermined groups of individual potentiometers, switch means associated with each sub-group potentiometer operable to selectively connect the sub-group potentiometers to their associated groups of individual potentiometers, and additional switch means operable to selectively connect the sub-group potentiometers to the grand master potentiometer.

14. In combination, a plurality of lighting circuits, means individual to each lighting circuit for controlling the voltage thereof, a plurality of control devices for controlling the voltage control means, a selector switch individual to each lighting circuit operable to select its associated voltage control means for connection to any one of the control devices, and switching means individual to each control device operable to connect all of the selected voltage control means to a control device, said switching means being so interlocked that when any one thereof is operated to connect a voltage control means to one control device said voltage control device cannot be connected to any other control device.

15. In combination, a plurality of lighting circuit control means, a plurality of control devices, means individual to each lighting circuit control means operable to select any one or a plurality of said lighting circuit control means to be controlled by one of said control devices, and means individual to each control device operable to render the selected lighting circuit control means responsive to the operation of one of the control devices and disposed when operated to prevent the connection of the lighting circuit control means to any other control device.

16. In combination, a plurality of lighting circuit control means, a plurality of control devices, means individual to each lighting circuit control means operable to select any one or a plurality of said lighting circuit control means to be controlled by one of said control devices, a plurality of groups of electro-responsive devices, each group being individual to a control device and the corresponding devices in each group being individual to a lighting circuit control means and operable in conjunction with its corresponding selector means to render its associated lighting circuit control means responsive to one of said control devices, and switching means individual to each control device for controlling the operation of said groups of electro-responsive devices.

17. A theater lighting control system comprising, a plurality of lighting circuits, voltage responsive means for controlling the energization of each lighting circuit, a plurality of resistance devices for controlling said voltage responsive means, a selector switch individual to each lighting circuit operable to prepare its associated voltage responsive means for connection to any one of the resistance devices, a group of relays individual to each resistance device, each relay of a group being individual to a voltage responsive means and operable in conjunction with the selector switch individual to the corresponding voltage responsive means to connect said voltage responsive means to the resistance device individual to the relay group, and switch means individual to each resistance device operable to effect the operation of all the relays in its associated group individual to the lighting circuits selected by the selector switches, whereby any one or combination of the lighting circuits may be rendered responsive to any one of the resistance devices.

18. A theater lighting control system comprising a plurality of lighting circuits, electro-responsive means for controlling the voltage of the lighting circuits, a plurality of control devices for controlling the operation of the electro-responsive means, selector means individual to each electro-responsive means operable to prepare its associated electro-responsive means for connection to any one of said control devices, a group of relays individual to each electro-responsive means, the relays of each group being individual to the control devices and each operable in conjunction with their associated selector means to connect their associated electro-responsive means to the particular control device associated therewith, said relays of each group being so interlocked that when any one is operated the others of the group are rendered inoperative, and an electrically-operated switch individual to each control device operable to simultaneously control the relays of each group individual to a control device, thereby to provide for rendering any desired group of lighting circuits responsive to any desired control device.

19. In combination, a plurality of voltage-responsive lighting circuit control devices, a plurality of individual voltage varying devices for controlling said lighting circuit control devices, switching means selectively operable to render certain of the lighting circuit control devices responsive only to certain of the individual voltage varying devices, a plurality of group master control devices, and switching means operable to selectively connect the individual control devices in groups to the group master control devices.

20. In combination, a plurality of voltage responsive lighting circuit control devices, a plurality of individual potentiometers for controlling said lighting circuit control devices, switching means operable to selectively connect different lighting circuit control devices to each individual potentiometer, a plurality of group master potentiometers, and switching means selectively operable to render the individual potentiometers individual effective to control their associated lighting circuit control devices or to selectively connect the individual potentiometers to the group master potentiometers.

21. A theater lighting system comprising, a plurality of lighting circuits, a plurality of control conductors, means for varying the voltage therein, a control means for each lighting circuit responsive to variations in voltage of an associated control conductor, a switch common to all of said control conductors and individual to each control means operable to prepare its associated control means for connection to any one of the control conductors, and switching means individual to each control conductor operable to connect all of said prepared control means to a control conductor individual to the operated switching means.

22. In combination, a plurality of lighting circuit control means, a plurality of control devices, a switch individual to each lighting circuit control means operable to prepare its associated lighting circuit control means to be controlled by any one of said control devices, and switching means individual to each control device and common to all of said lighting circuit control means operable to render the prepared lighting circuit control means responsive to the operation of the control device individual to the operated switching means.

23. A theater lighting system comprising, a plurality of lighting circuits, a plurality of control circuit means, means for varying the voltage therein, a control means for each lighting circuit responsive to variations in voltage in any control circuit means with which it may be associated, a group of current responsive relays individual to each control circuit means, each group of relays comprising a relay individual to each lighting circuit control means for connecting any lighting circuit control means to any one of the control circuit means, a switch individual to each lighting circuit control means operable to prepare all of the current responsive relays in each group which are common to each lighting circuit control means for operation, and switching means individual to each control circuit means and each group of current responsive relays operable to energize all of the current responsive relays of its associated group which have been prepared for operation, whereby any combination of lighting circuit control means may be connected to any one of the control circuit means.

24. In combination, a plurality of lighting circuits, means individual to each lighting circuit for controlling the voltage thereof, a plurality of control devices, a switch individual to each voltage controlling means operable to prepare its associated voltage controlling means for connection to any one of the control devices, and electrically-operated switching means individual to each control device and common to all of said voltage controlling means operable to connect all of the prepared voltage controlling means to the control device which is individual to the operated switching means, whereby different lighting circuit combinations may be controlled by the control devices.

25. In combination, a plurality of lighting circuits, control means for each lighting circuit, a plurality of manually-operable voltage varying devices for controlling the lighting circuit control means, a switch individual to each lighting circuit control means operable to select its associated lighting circuit control means for connection to any one of the manually-operable voltage varying devices, and means comprising a plurality of switching devices each individual to a manually-operable voltage varying device for connecting the selected lighting circuit control means to any one of the voltage varying devices.

26. In combination, a plurality of lighting circuits, voltage responsive means for controlling each lighting circuit, a plurality of control devices for controlling the voltage responsive means, a group of electro-responsive relays individual to each control device, said relays being operable to connect the voltage responsive means of each lighting circuit to their associated control device, a switch individual to each voltage responsive means operable to prepare all of the relays of each group common to each lighting circuit for operation, and a switch individual to each control device operable to effect the energization of all the relays in the group associated therewith which have been prepared for operation.

27. A theater lighting system comprising, a plurality of lighting circuits, a plurality of control conductors, means for varying the voltage therein, a control means for each lighting circuit responsive to variations in voltage of any associated control conductor, a group of electro-responsive switches individual to each lighting circuit control means corresponding switches in each group being individual to each control conductor and disposed when operated to connect their associated control means to their common control conductor, a switch individual to each lighting circuit control means operable to render any one of said electro-responsive switches in each group operable, and an electrically-operable switch means individual to each control conductor operable to effect the operation of all the electro-responsive switches individual thereto of each group which have been rendered operable, thereby to connect any one or group of the lighting circuit control means to a control conductor.

BURT S. BURKE.
STANLEY R. McCANDLESS.
DEAN H. HOLDEN.
CLAUDE W. STEDMAN.